(12) United States Patent
Helmers et al.

(10) Patent No.: US 12,207,137 B2
(45) Date of Patent: Jan. 21, 2025

(54) COLLABORATIVE NEIGHBOUR RELATION INFORMATION

(71) Applicant: Nokia Technologies Oy, Espoo (FI)

(72) Inventors: Hakon Helmers, Sceaux (FR); Anna Pantelidou, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 392 days.

(21) Appl. No.: 17/762,556

(22) PCT Filed: Sep. 23, 2019

(86) PCT No.: PCT/EP2019/075471
§ 371 (c)(1),
(2) Date: Mar. 22, 2022

(87) PCT Pub. No.: WO2021/058078
PCT Pub. Date: Apr. 1, 2021

(65) Prior Publication Data
US 2022/0345943 A1    Oct. 27, 2022

(51) Int. Cl.
*H04W 28/16*      (2009.01)
*H04L 5/00*       (2006.01)
*H04W 72/29*      (2023.01)

(52) U.S. Cl.
CPC .......... *H04W 28/16* (2013.01); *H04L 5/0032* (2013.01)

(58) Field of Classification Search
CPC .............................. H04W 28/16; H04L 5/0032
See application file for complete search history.

(56) References Cited

U.S. PATENT DOCUMENTS

| | | | |
|---|---|---|---|
| 2018/0376380 A1* | 12/2018 | Leroux | ................. H04W 76/18 |
| 2019/0075023 A1 | 3/2019 | Sirotkin | |
| 2019/0075552 A1 | 3/2019 | Yu et al. | |
| 2019/0182716 A1 | 6/2019 | Futaki et al. | |
| 2019/0373627 A1* | 12/2019 | Luo | ....................... H04W 24/10 |

(Continued)

FOREIGN PATENT DOCUMENTS

| | | |
|---|---|---|
| WO | 2019/097110 A1 | 5/2019 |
| WO | 2021058078 A1 | 4/2021 |

OTHER PUBLICATIONS

"3rd Generation Partnership Project; Technical Specification Group Radio Access Network; NG-RAN; F1 application protocol (F1AP) (Release 15)", 3GPP TS 38.473, V15.5.0, Mar. 2019, pp. 1-198.

(Continued)

*Primary Examiner* — Xuan Lu
(74) *Attorney, Agent, or Firm* — Robert P. Michal, Esq.; Carter, DeLuca & Farrell LLP (57) ABSTRACT

An apparatus is provided, the apparatus being connectable to at least one user equipment by a radio connection, and being connectable to at least one centralized unit, the apparatus comprising at least one processor and at least one memory including computer program code, the at least one memory and the computer program code configured to, with the at least one processor, cause the apparatus at least to perform: sending to at least one centralized unit sharing information which concern information about sharing of same physical radio resources of the apparatus with more than one centralized unit.

1 Claim, 4 Drawing Sheets

(56) References Cited

U.S. PATENT DOCUMENTS

2020/0162211 A1* 5/2020 Wang .................... H04L 5/0091

OTHER PUBLICATIONS

"3rd Generation Partnership Project; Technical Specification Group Radio Access Network; NG-RAN; Xn application protocol (XnAP) (Release 15)", 3GPP TS 38.423, V15.3.0, Mar. 2019, pp. 1-294.
"3rd Generation Partnership Project; Technical Specification Group Radio Access Network; NG-RAN; Architecture description (Release 15)", 3GPP TS 38.401, V15.5.0, Mar. 2019, pp. 1-39.
"RAN sharing with multiple Cell ID broadcast", 3GPP TSG-RAN WG3 Meeting #104, R3-193259, Ericsson, May 13-17, 2019, 7 pages.
Ferrus et al., "Management of Network Slicing in 5G Radio Access Networks: Functional Framework and Information Models", arXiv, Mar. 3, 2018, 16 pages.
International Search Report and Written Opinion received for corresponding Patent Cooperation Treaty Application No. PCT/EP2019/075471, dated May 18, 2020, 12 pages.
Office Action received for corresponding European Patent Application No. 19778912.6, dated Nov. 29, 2023, 6 pages.
Samsung, et al.; "Relationship among gNB-CU, gNB-DU and cell"; 3GPP TSG-RAN WG3 Meeting #96; R3-171631; Hangzhou, P.R. China, May 15-19, 2017; 3 pgs.
Kennedy, et al.; "gNB-DU management function"; 3GPP TSG RAN WG3 #97; R3-173307; Small Cell Forum; Berlin, Germany, Aug. 21-25, 2017; 3 pgs.
"Further discussion on PLMN information for RAN sharing"; 3GPP TSG RAN WG3 Meeting #103; R3-190399; Athens, Greece, Feb. 25-Mar. 1, 2019; 6 pgs.

* cited by examiner

COLLABORATIVE NEIGHBOUR RELATION INFORMATION

CROSS-REFERENCE TO RELATED APPLICATION

This application is the National Stage of, and therefore claims the benefit of, International Application No. PCT/EP2019/075471 filed on Sep. 23, 2019, entitled "COLLABORATIVE NEIGHBOUR RELATION INFORMATION," which was published in English under International Publication Number WO 2021/058078 on Apr. 1, 2021. The above application is commonly assigned with this National Stage application and incorporated herein by reference in its entirety.

FIELD OF THE INVENTION

The present invention relates to an apparatus, a method and a computer program product for providing collaborative neighbour relation information.

RELATED BACKGROUND ART

The following meanings for the abbreviations used in this specification apply:
5GC: 5G Core Network
ANR: Automatic Neighbour Relation
CIO: Cell Individual Offset
CU: Centralized Unit
DU: Distributed Unit
gNB: Next Generation NodeB
MRO: Mobility Robustness Optimization
OAM: Operation and Maintenance
PDCP: Packet Data Convergence Protocol
PLMN: Public Land Mobile Network
RAN: Radio Access Network
RRC: Radio Resource Control.
SDAP: Service Data Adaptation Protocol
TNL: Transport Network Layer
UE: User Equipment Example embodiments, although not limited to this, relate to gNBs. The NG-RAN architecture consists of a set of gNBs connected with each other through the Xn interface. gNBs coordinate with each other by means of the XnAP procedures as defined in 3GPP TS 38.423. They are also connected to the 5GC through the NG interface. A gNB may comprise a CU (gNB-CU) and set of DUs (gNB-DU). The CU is a logical node hosting RRC, SDAP and PDCP protocols of the gNB or RRC and PDCP protocols of the en-gNB that controls the operation of one or more gNB-DUs. The gNB-DU is a logical node hosting RLC, MAC and PHY layers of the gNB or en-gNB, and its operation is partly controlled by gNB-CU. One gNB-DU supports one or multiple cells.

The gNB-DUs under a gNB-CU typically comprise a large number. A gNB-CU and a gNB-DU are connected to each other through the F1 Interface and they communicate with F1AP procedures as defined in 3GPP TS 38.473. A gNB-DU is connected to a single gNB-CU. The NG-RAN architecture (TS 3GPP 38.401) is shown in FIG. 4.

Figure 4:
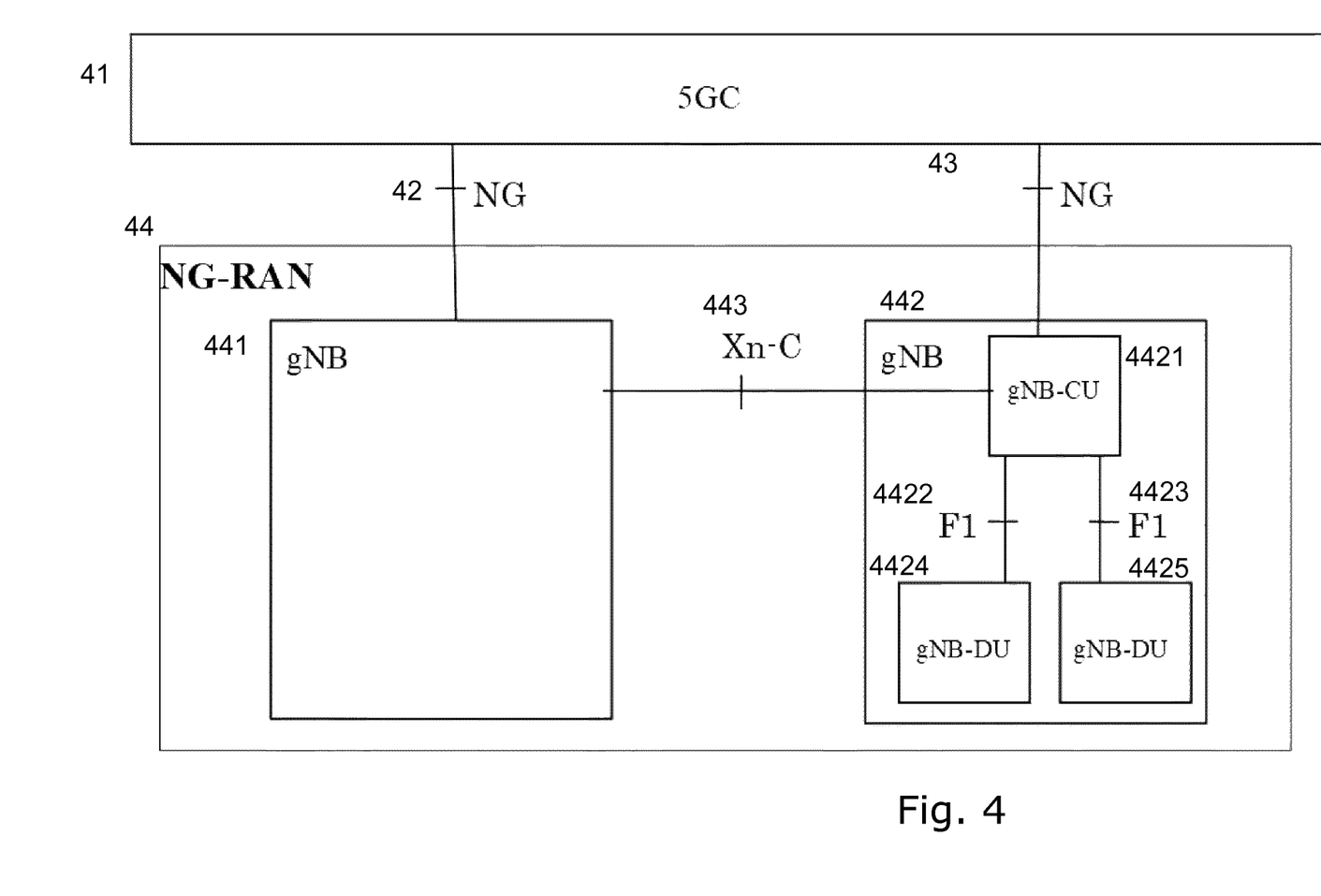
FIG. 4 shows the 5G NR architecture overview and interfaces, wherein the CU-DU split inside a gNB is illustrated.

In particular, FIG. 4 shows a 5G core network (5GC) 41 and a NG-RAN 44. In this example, the NG-RAN comprises two gNBs 441 and 442, which are connected to the 5G core network 41 via NG interfaces 42 and 43. The gNBs 441 and 442 are connected to each other via an Xn-C interface. In FIG. 4, the internal split architecture of the gNB 442 is shown. In particular, the gNB 442 comprises a gNB-CU 4421 and two gNB-DUs 4424 and 4425. The gNB-DUs 4424 and 4425 are connected to the gNB-CU via F1 interfaces 4422 and 4423.

It is noted that the connections of the gNB 442 via the NG interface 43 and the Xn-C interface 443 are provided at the gNB-CU 4421.

RAN3 has enabled Rel-15 signalling allowing per-operator gNB-CU in network sharing scenario where physical layer cell resources are shared between multiple operators.

Thus, there is a need for handling such a network sharing scenario, in which a gNB-DU may be connected to multiple gNB-CUs.

SUMMARY OF THE INVENTION

Example embodiments of the present invention address this situation and aim to provide a mechanism to handle sharing of physical radio resource between different centralized units.

According to a first aspect, an apparatus is provided which is connectable to at least one user equipment by a radio connection, and is connectable to at least one centralized unit, wherein the apparatus comprises at least one processor and at least one memory including computer program code, the at least one memory and the computer program code configured to, with the at least one processor, cause the apparatus at least to perform: sending to at least one centralized unit sharing information which concern information about sharing of same physical radio resources of the apparatus with more than one centralized unit.

According to a second aspect, a method is provided for use in a distributed unit, which is connectable to at least one user equipment by a radio connection and is connectable to at least one centralized unit, the method comprising:
sending to at least one centralized unit sharing information which concern information about sharing of same physical radio resources of the apparatus with more than one centralized unit.

The first and second aspects may be modified as follows:
The sharing information may comprise indicating whether the apparatus is sharing physical radio resources or not.

The apparatus or the method may indicate that the apparatus or distributed unit is sharing physical radio resource may be sent, when it is detected that a new centralized unit is provided.

The sharing information may comprise a setup that is being shared with another centralized unit.

The sharing information may comprise a neighbour relation information.

The apparatus or the distributed unit may receive a request for providing neighbour relation information from a centralized unit and may forward neighbour relation information to the centralized unit.

The neighbour relation information may comprise information about neighbour cells.

According to a third aspect, an apparatus is provided which is connectable to at least one distributed unit, the apparatus comprising: at least one processor and at least one memory including computer program code, the at least one memory and the computer program code configured to, with the at least one processor, cause the apparatus at least to perform: receiving, from the at least one distributed unit sharing information which concern information about sharing of same physical radio resources of the apparatus with more than one centralized unit.

According to a second aspect, a method is provided for use in a centralized unit connectable to at least one distributed unit, the method comprising:

receiving, from the at least one distributed unit sharing information which concern information about sharing of same physical radio resources of the apparatus with more than one centralized unit.

The third and fourth aspects may be modified as follows:

The sharing information may comprise indicating whether the distributed unit is sharing physical radio resources or not.

The sharing information may comprise a setup that the distributed unit is sharing with another centralized unit.

The sharing information may comprise a neighbour relation information.

The apparatus or the centralized unit may forward a request for providing neighbour relation information from another centralized unit via the distributed unit, and may receive the neighbour relation information from the distributed unit.

The apparatus or the centralized unit may detect neighbour relations, and forward information concerning new neighbour relations as the neighbour relation information to the distributed unit.

The neighbour relation information may comprise information about neighbour cells.

According to a fifth aspect of the present invention a computer program product is provided which comprises code means for performing a method according to any one of the second and fourth aspects and/or their modifications when run on a processing means or module. The computer program product may be embodied on a computer-readable medium, and/or the computer program product may be directly loadable into the internal memory of the computer and/or transmittable via a network by means of at least one of upload, download and push procedures.

According to a sixth aspect an apparatus is provided, which is connectable to at least one user equipment by a radio connection and is connectable to at least one centralized unit, the apparatus comprising means for sending to at least one centralized unit sharing information which concern information about sharing of same physical radio resources of the apparatus with more than one centralized unit.

According to a seventh aspect an apparatus is provided, which is connectable to at least one distributed unit, the apparatus comprising means for receiving, from the at least one distributed unit sharing information which concern information about sharing of same physical radio resources of the apparatus with more than one centralized unit.

The sixth to seventh aspects may be modified similar as the first and third aspects.

BRIEF DESCRIPTION OF THE DRAWINGS

These and other objects, features, details and advantages will become more fully apparent from the following detailed description of example embodiments of the present invention which is to be taken in conjunction with the appended drawings, in which.

DETAILED DESCRIPTION OF EXAMPLE EMBODIMENTS

In the following, description will be made to example embodiments of the present invention. It is to be understood, however, that the description is given by way of example only, and that the described example embodiments are by no means to be understood as limiting the present invention thereto.

Before describing example embodiments in detail, the problem underlying the present application is described in some more detail.

As mentioned above, RAN3 has enabled Rel-15 signalling allowing per-operator gNB-CU in network sharing scenario where physical layer cell resources are shared between multiple operators. This is documented as follows in TS 38.401 CR #0067r1 (R3-193259):

"One gNB-DU is connected to only one gNB-CU.

NOTE: In case of network sharing with multiple cell ID broadcast, each Cell Identity associated with a subset of PLMNs corresponds to a gNB-DU and the gNB-CU it is connected to, i.e. the corresponding gNB-DUs share the same physical layer cell resources.

NOTE: For resiliency, a gNB-DU may be connected to multiple gNB-CUs by appropriate implementation."

This new solution implies new scenarios to be supported such as operator addition and operator removal. Some limited description for inter-CU coordination can be found in TS 38.401 CR #0067r1 (R3-193259) annex B.

This description doesn't cover neighbour relation information coordination, and it is also indicated that "Other coordination between gNB-CUs is ensured by appropriate implementation".

Figure 5:
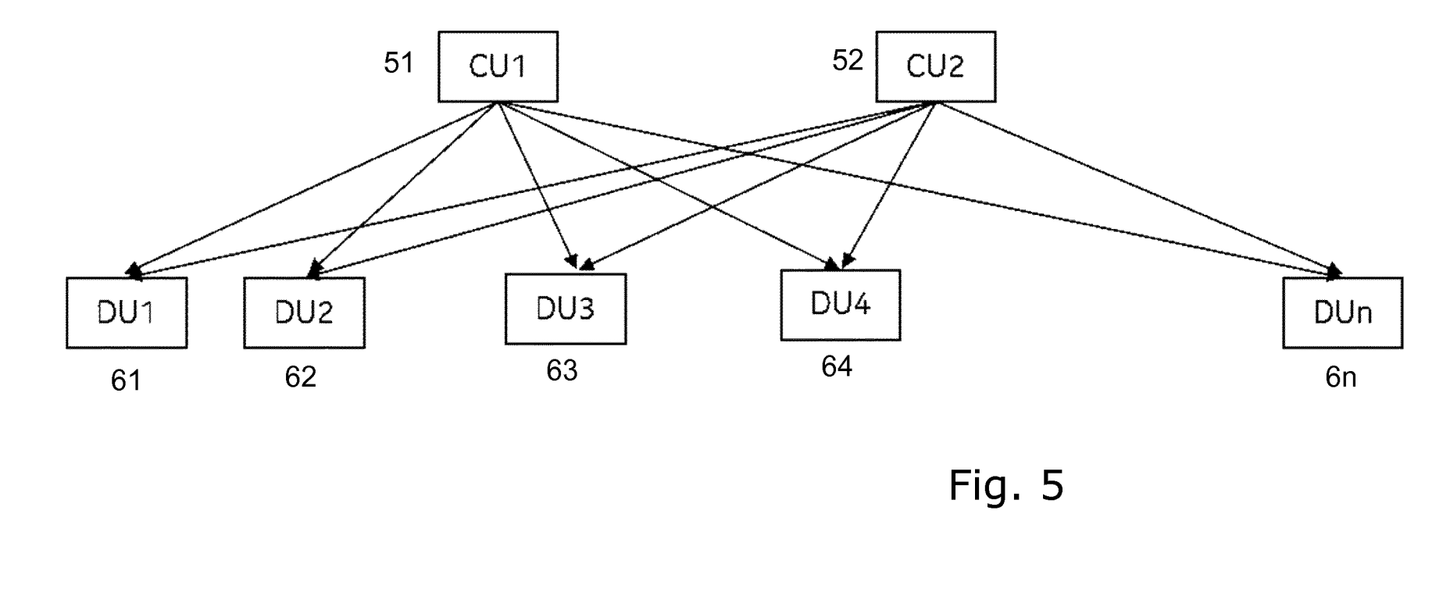
FIG. 5 illustrates a CU/DU split architecture.

FIG. 5 shows an CU/DU split architecture, illustrating a scenario with distributed units DU1 to DUn denoted by reference signs 61, 62, 63, 64 and 6n, which share the same physical radio resources, and two centralized units CU1 and CU2 denoted by reference signs 51 and 52.

It is noted that it is broadly assumed that per-PLMN DUs sharing the same radio resources are collocated. In this description we refer to a group of such per-PLMN DUs as a "DU" or "gNB-DU".

According to some example embodiments, measures are provided by which it is possible that an operator entering a shared network may benefit from already established neighbour relation information (ANR, mobility thresholds) in order to be able to immediately serve its subscribers, and that standardized coordination for this could be considered in future releases.

ANR (Automatic Neighbour Relation) is a function by which a network element such as a gNB can automatically determine which cells are their neighbours. If a newly entered sharing operator has to perform ANR from scratch in an area where the neighbour relations are already well established, its subscribers would unnecessarily experience slower handover execution due to the necessity to perform UE CGI reading, perform TNL discovery and setup new X2 and Xn interfaces each time a "new" neighbour relation is discovered. The newly entered operator may have few users in that area (hence the RAN sharing), so the UE-based ANR process could take time until the full set of neighbour relations is robustly identified. And the same problem is valid for the cell individual offset for MRO; the newly entered operator must use a pre-configured CIO (Cell Individual Offset), without taking benefit from information already available.

The same problem occurs when network topology in that area is updated.

The problem can typically not be solved via OAM, because different operators use different OAMs.

Example embodiments aim to solve this problem.

In the following, a general overview of some example embodiments is described by referring to FIGS. 1 and 2.

Figure 1:
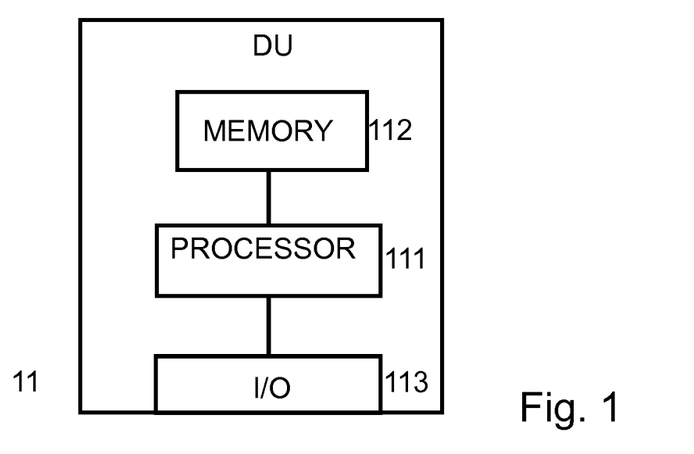
FIG. 1 shows a distributed unit (DU) 1 according to an example embodiment.

FIG. 1 shows a distributed unit (DU) 11 as an example for a first apparatus according to the present example embodiment. The DU 11 may be, together with other distributed units and/or at least one centralized unit (CU) shown in FIG. 2, be provided in a gNB or a similar network element. The apparatus may be the distributed unit, or may be a part of the distributed unit, or may be a network element comprising the distributed unit.

Figure 2:
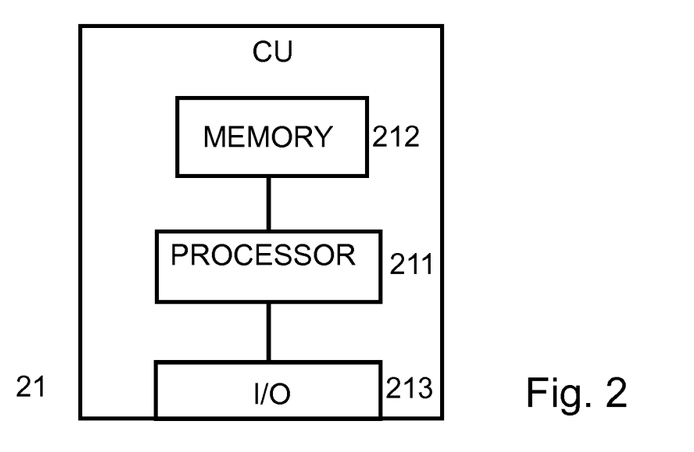
FIG. 2 shows a centralized unit (CU) 2 according to an example embodiment.

The DU 11 is connectable to at least one user equipment by a radio connection, and being connectable to at least one centralized unit (e.g., CU 2 shown in FIG. 2). The DU 11 comprises at least one processor 111 and at least one memory 112 including computer program code. The at least one processor 111, with the at least one memory 112 and the computer program code, is configured to cause the apparatus to perform: sending to at least one centralized unit sharing information which concern information about sharing of same physical radio resources of the apparatus (as shown, for example, in messages 1, 3, 6 and 10 in FIG. 3 to be described later).

FIG. 2 shows a centralized unit (CU) 21 as an example for a second apparatus according to the present example embodiment. The CU 21 may be, together with at least one distributed unit (DU) such as shown in FIG. 1 and other centralized units be provided in a gNB or a similar network element. The apparatus may be the centralized unit, or may be a part of the centralized unit, or may be a network element comprising the centralized unit.

The CU 21 is connectable to at least one distributed unit (e.g., DU 11 shown in FIG. 2). The CU 21 comprises at least one processor 211 and at least one memory 212 including computer program code. The at least one processor 211, with the at least one memory 212 and the computer program code, is configured to cause the apparatus to perform: receiving, from the at least one distributed unit sharing information which concern information about sharing of same physical resources of the apparatus with more than one centralized unit (as shown, for example, in messages 1, 3, 6 and 10 in FIG. 3 to be described later).

The DU 11 may further comprise an I/O unit 113, which is capable of transmitting to and receiving from the CU 21, and the CU 21 may further comprise an I/O unit 213, which is cable of transmitting to and receiving from the DU 11, for example.

Thus, according to example embodiments, information concerning sharing of physical radio resources by a distributed unit is shared between the distributed unit and the centralized unit(s).

For example, the sharing information described above may comprise indicating whether the distributed unit is sharing physical radio resources or not, or may comprise a setup that is being shared with another centralized unit, or may a neighbour relation information, which indicate information concerning neighbour cell relations. For example, the neighbour relation information may be ANR information or the like. Indicating whether the distributed unit is sharing physical radio resources or not may be performed by including an indicator (such as a "Shared Physical Resource Indicator" described later) in the sharing information.

In the following, some example embodiments are described in more detail.

In particular, the following is proposed:

Signaling from collocated DUs to the corresponding possibly separated CUs to indicate sharing of the same physical layer cell resources.

In the presence of sharing of physical layer cell resources, the appropriate signaling and mechanisms to transfer CU related neighbour information to DU over F1 interface are provided, and signaling and mechanisms to update neighbour related information at the DU when this information has changed are provided.

This is described in the following in more detail by referring to FIG. 3, which shows an example in which a DU is connected to two CUs, namely CU1 and CU2.

A gNB-DU can indicate to a gNB-CU whether it is sharing physical radio resources. This can be done by adding a new information element "Shared Physical Resource Indicator" (which may also referred to as "Shared gNB-DU Indicator") at F1 SETUP REQUEST message from gNB-DU to gNB-CU (Message 1).

A gNB-DU indicates at setup that it is being shared already with other gNB-CU(s).

The Shared Physical Resource Indicator IE can be a binary variable taking value 1 if the gNB-DU is shared and 0 otherwise.

Figure 3:
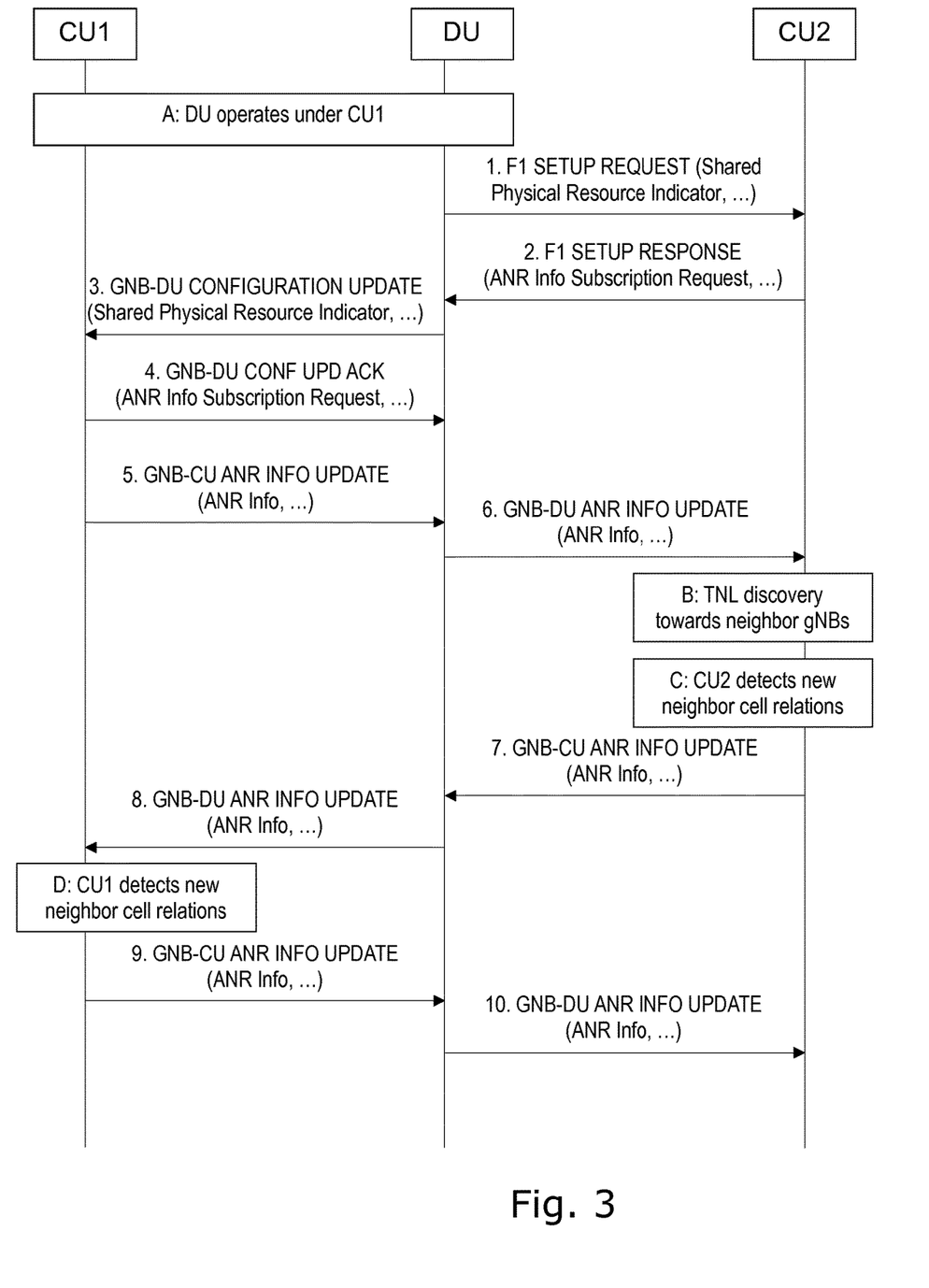
FIG. 3 shows a message flow in an example in which a DU is connected to two CUs according to an example embodiment.

As shown in FIG. 3, in process A it is assumed that the DU operates only under CU1. In message 1, the DU sends the F1 SETUP REQUEST message, which includes the Shared Physical Resource Indicator. The CU2 may then respond with a F1 SETUP RESPONSE message including an ANR Info Subscription Request in message 2. That is, the CU2 subscribes to ANR information at the DU.

A gNB-DU operating under a gNB-CU in a non-shared mode may become shared when e.g., a new operator joins. The DU in that case may indicate this change of status from non-shared to shared in a gNB-DU CONFIGURATION UPDATE message from gNB-DU to the gNB-CU it is connected.

This is shown in FIG. 3 in message 3. That is, the DU sends a GNB-DU CONFIGURATION UPDATE message to the CU1, which includes the Shared Physical Resource Indicator. The CU1 may then respond with an update acknowledgment in a GNB-DU CONF ACK message, which comprises an ANR Info Subscription Request, in message 4. That is, similar as in case of message 2, the CU1 subscribes to ANR information at the DU.

When the CU1 has updated ANR information, it sends a GNB-CU ANR INF UPDATE message including ANR information to the DU in message 5. The DU forwards this updated ANR information in a GNB-DU ANR INFO UPDATE message to the CU2 in message 6.

Thus, if the gNB-CU2 receives an F1 SETUP REQUEST from the gNB-DU with the indication "Shared Physical Resource Indicator" (message 1), the gNB-CU2 in the F1 SETUP RESPONSE may request neighbour relation information pertaining to gNB-CU1 (messages 2-6). Communication of neighbour relation information takes place through the shared DU. It is noted that the ANR information shown in FIG. 3 is only an example for neighbour relation information.

The request of neighbour relation information in the F1 SETUP RESPONSE is triggered by the DU's change of status from non-shared to shared (message 2, message 4).

It is now assumed that in process B, the CU2 performs a TNL discovery towards neighbour gNBs, and in process C, the CU2 detects new neighbour cell relations. Hence, the CU2 has updated ANR information. Therefore, the CU2 sends a GNB-CU ANR INFO UPDATE message including the ANR information to the DU in message 7. The DU forwards the ANR information in a GNB-DU INFO UPDATE message to the CU1 in message 8.

Likewise, it is assumed that the CU1 detects new neighbour cell relations in process D. Then, the CU1 sends updated ANR information in a GNB-CU-ANF INFO UPDATE to the DU in message 9. The DU forwards the ANR information in a GNB-DU INFO UPDATE message to the CU2 in message 10.

A gNB-CU can maintain a table of sharing relationships. Namely, gNB-DU IDs that are shared and with which PLMN IDs, which identify the operators, this sharing takes place. When a gNB-CU detects new neighbours, it sends an update message to its gNB-DUs with the updated info.

That is, only new "undiscovered" information needs to be communicated in messages 7, 9.

When a gNB-DU receives new neighbour relationships from a gNB-CU, it must inform all other gNB-CU(s) with which it is being shared (Messages 8, 10).

The gNB-DU could alternatively send a gNB-CU ANR information upon request from a gNB-CU.

Hence, according to example embodiments, the following advantages can be achieved:

A newly entered operator can start using the network immediately, and its subscribers will benefit from an already optimized network.

The quality of the neighbour information will not depend on the number of UEs for that operator in the given geographical area.

The above-described example embodiments are only examples and may be modified.

Names of network elements, protocols, and methods are based on current standards. In other versions or other technologies, the names of these network elements and/or protocols and/or methods may be different, as long as they provide a corresponding functionality.

In general, the example embodiments may be implemented by computer software stored in the memory (memory resources, memory circuitry) 112, 212 and executable by the processor (processing resources, processing circuitry) 111, 211 or by hardware, or by a combination of software and/or firmware and hardware.

As used in this application, the term "circuitry" refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The memory (memory resources, memory circuitry) 112, 212 may be of any type suitable to the local technical environment and may be implemented using any suitable data storage technology, such as semiconductor based memory devices, magnetic memory devices and systems, optical memory devices and systems, fixed memory and removable memory, and non-transitory computer-readable media. The processor (processing resources, processing circuitry) 111, 211 may be of any type suitable to the local technical environment, and may include one or more of general purpose computers, special purpose computers, microprocessors, digital signal processors (DSPs) and processors based on a multi core processor architecture, as non-limiting examples.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus,
the apparatus being connectable to at least one user equipment by a radio connection, and being connectable to at least one centralized unit,
the apparatus comprising:
at least one processor and at least one memory including computer program code, the at least one memory and the computer program code configured to, with the at least one processor, cause the apparatus at least to perform:
sending to at least one centralized unit sharing information which concern information about sharing of same physical radio resources of the apparatus with more than one centralized unit, wherein the sharing information includes indicating whether the apparatus is sharing physical radio resources or not and consists of setup that is being shared with another centralized unit, and a neighbor relation information, whereby, the neighbor relation information includes information about neighbor cells, wherein the neighbor relation information further includes Automatic Neighbor Relation (ANR) information;
indicating that the apparatus is sharing physical radio resources when detecting that the second centralized unit is provided;
forwarding the ANR information in a GNB-DU INFO UPDATE message to a second centralized unit;

receiving a request for providing neighbor relation information from a centralized unit, and forwarding neighbor relation information to the centralized unit.

\* \* \* \* \*